US007188832B2

(12) United States Patent
Kita et al.

(10) Patent No.: US 7,188,832 B2
(45) Date of Patent: Mar. 13, 2007

(54) LOCATING AND CLAMPING APPARATUS

(75) Inventors: Kazushi Kita, Yawara-mura (JP); Kenichi Takeda, Yawara-mura (JP)

(73) Assignee: SMC Corporation, Tokyo (JP)

( * ) Notice: Subject to any disclaimer, the term of this patent is extended or adjusted under 35 U.S.C. 154(b) by 116 days.

(21) Appl. No.: 10/865,716

(22) Filed: Jun. 10, 2004

(65) Prior Publication Data

US 2005/0017423 A1 Jan. 27, 2005

(30) Foreign Application Priority Data

Jul. 1, 2003 (JP) ............................ 2003-189493

(51) Int. Cl.
*B23Q 3/08* (2006.01)

(52) U.S. Cl. .......................................... 269/32; 269/24

(58) Field of Classification Search .................. 269/32, 269/24, 27, 91–94, 228, 233, 232, 237
See application file for complete search history.

(56) References Cited

U.S. PATENT DOCUMENTS 6,378,855 B1 * 4/2002 Sawdon et al. ............... 269/32
6,685,177 B2 * 2/2004 Dugas et al. ................. 269/32
6,913,254 B2 * 7/2005 Pavlik et al. ................. 269/49
2005/0017423 A1 * 1/2005 Kita et al. ..................... 269/32
2005/0040578 A1 * 2/2005 Sawdon et al. ............... 269/32

FOREIGN PATENT DOCUMENTS

JP 337770 11/2002

* cited by examiner

*Primary Examiner*—Lee D. Wilson
(74) *Attorney, Agent, or Firm*—Baker Botts L.L.P.

(57) ABSTRACT

A locating and clamping apparatus can prevent spatter from entering the clamp body through a spatter discharge hole. A longitudinal groove is formed in a side surface of the clamp body so as to communicate with both a spatter discharge hole and a hole for supporting a fulcrum pin. A spatter protecting cover having an upper cover member and a lower cover member is fitted in the longitudinal groove. The upper cover member of the spatter protecting cover prevents the fulcrum pin from coming off, and the lower cover member of the spatter protecting cover opens or closes the spatter discharge hole.

3 Claims, 13 Drawing Sheets

LOCATING AND CLAMPING APPARATUS

BACKGROUND OF THE INVENTION

1. Field of the Invention

The present invention relates to a locating and clamping apparatus for use, for example, in an automotive body assembling process to position a panel-shaped workpiece with a locating pin and to clamp the positioned workpiece.

2. Description of the Related Art

FIGS. 14A and 14B of the accompanying drawings show a conventional locating and clamping apparatus based on the disclosure of Japanese Patent Application Unexamined Publication (KOKAI) No. 2002-337770 (patent document 1). In the locating and clamping apparatus according to the patent document 1, a clamp body 10 is provided with a locating pin 11 projecting therefrom. A seating surface 12 is formed outside a lower portion of the locating pin 11. A clamp arm is movably disposed in both a longitudinal hole 13 of the clamp body 10 and a hollow hole of the locating pin 11. An output member of a direct acting actuator 17 is reciprocatably disposed in the longitudinal hole 13 of the clamp body 10. The clamp arm and the output member are connected to each other through a connecting pin. A fulcrum pin 19 extends through a guide slot 18 formed in the clamp arm. The fulcrum pin 19 is supported by fulcrum pin supporting holes in the clamp body 10. FIG. 14A shows a state where the locating pin 11 has been inserted through a positioning hole (locating hole) in a panel-shaped workpiece 24, and the workpiece 24 has been clamped between a distal end portion 23 of the clamp arm and the seating surface 12.

If a welding operation is performed on the workpiece 24 clamped as stated above, spatter (slags and metal particles) scattered during welding enters the longitudinal hole 13 of the clamp body 10 through an opening 22 that allows the hollow hole of the locating pin 11 to communicate with the outside. To remove spatter having entered the clamp body 10, the locating and clamping apparatus according to the patent document 1 needs to be disassembled and cleaned periodically. Conventionally, however, a spatter discharge hole 25 is formed in the clamp body 10 to provide communication between the longitudinal hole 13 and the outside, thereby allowing spatter to be discharged from the spatter discharge hole 25 without the need to disassemble the apparatus. Therefore, the spatter discharge hole 25 is shown in FIG. 14A. It is also conventional practice to arrange the locating and clamping apparatus so as to prevent the fulcrum pin 19 from coming off, as shown in FIG. 14B, although this arrangement is not explicitly stated in the patent document 1. That is, end portions of the fulcrum pin 19 are made to project to the outside from the fulcrum pin supporting holes. Split pins 27 are passed through respective through-holes pierced in both end portions of the fulcrum pin 19, and the distal ends of the split pins 27 are bent as shown in the figure.

In the prior art shown in FIGS. 14A and 14B, spatter may enter the longitudinal hole 13 of the clamp body 10 through the spatter discharge hole 25 and accumulate therein, depending on the use conditions of the locating and clamping apparatus. Consequently, the frequency with which welding or other operation is suspended to perform a spatter discharge operation increases, resulting in a reduction in the operating efficiency. Further, to remove the fulcrum pin 19 to disassemble the locating and clamping apparatus, it is necessary to pull out the split pins 27 by straightening the bent end portions of the split pins 27 with a specially prepared tool. Therefore, the operating efficiency is unfavorably low.

SUMMARY OF THE INVENTION

A first object of the present invention is to provide a locating and clamping apparatus wherein spatter is prevented from entering the clamp body through the spatter discharge hole.

A second object of the present invention is to provide a locating and clamping apparatus wherein the fulcrum pin can be easily removed when the apparatus is disassembled.

The present invention is applied to a locating and clamping apparatus including a clamp body having a longitudinal hole and a locating pin projecting from the clamp body. The locating pin has a hollow hole communicating with the longitudinal hole in the clamp body. A seating surface is formed outside the locating pin. A clamp arm is movably disposed in both the longitudinal hole of the clamp body and the hollow hole of the locating pin. An output member of a direct acting actuator is reciprocatably disposed in the longitudinal hole of the clamp body. The output member and the clamp arm are connected to each other through a connecting pin. A fulcrum pin extends through a guide slot formed in the clamp arm. The fulcrum pin is supported at each end thereof by a fulcrum pin supporting hole in the clamp body. A spatter discharge hole is formed in the clamp body to allow the longitudinal hole to communicate with the outside. A workpiece can be clamped between a distal end portion of the clamp arm and the seating surface.

According to a first arrangement of the present invention, a spatter protecting cover is removably fitted at the discharge end of the spatter discharge hole. When the spatter protecting cover is fitted, the spatter discharge hole is closed. When the spatter protecting cover is removed, the spatter discharge hole is opened.

In addition, the present invention is applied to a locating and clamping apparatus including a clamp body having a longitudinal hole and a locating pin projecting from the clamp body. The locating pin has a hollow hole communicating with the longitudinal hole in the clamp body. A seating surface is formed outside the locating pin. A clamp arm is movably disposed in both the longitudinal hole of the clamp body and the hollow hole of the locating pin. An output member of a direct acting actuator is reciprocatably disposed in the longitudinal hole of the clamp body. The output member and the clamp arm are connected to each other through a connecting pin. A fulcrum pin extends through a guide slot formed in the clamp arm. The fulcrum pin is supported at each end thereof by a fulcrum pin supporting hole in the clamp body. A spatter discharge hole is formed in the clamp body to allow the longitudinal hole to communicate with the outside. A workpiece can be clamped between a distal end portion of the clamp arm and the seating surface.

According to a second arrangement of the present invention, a longitudinal groove is formed at the outer end of the fulcrum pin supporting hole. Slide grooves are respectively formed in a pair of mutually opposing side walls of the longitudinal groove. A cover is fitted in the slide grooves. The cover prevents the fulcrum pin from coming off.

In addition, the present invention is applied to a locating and clamping apparatus including a clamp body having a longitudinal hole and a locating pin projecting from the clamp body. The locating pin has a hollow hole communicating with the longitudinal hole in the clamp body. A seating surface is formed outside the locating pin. A clamp arm is movably disposed in both the longitudinal hole of the clamp body and the hollow hole of the locating pin. An output member of a direct acting actuator is reciprocatably disposed in the longitudinal hole of the clamp body. The output member and the clamp arm are connected to each other through a connecting pin. A fulcrum pin extends through a guide slot formed in the clamp arm. The fulcrum pin is supported at each end thereof by a fulcrum pin supporting hole in the clamp body. A spatter discharge hole is formed in the clamp body to allow the longitudinal hole to communicate with the outside. A workpiece can be clamped between a distal end portion of the clamp arm and the seating surface.

According to a third arrangement of the present invention, a longitudinal groove is formed in a side surface of the clamp body. The longitudinal groove communicates with both the spatter discharge hole and the fulcrum pin supporting hole. Slide grooves are respectively formed in a pair of mutually opposing side walls of the longitudinal groove. A spatter protecting cover having an upper cover member and a lower cover member is fitted in the slide grooves. The upper cover member of the spatter protecting cover prevents the fulcrum pin from coming off, and the lower cover member of the spatter protecting cover opens or closes the spatter discharge hole.

According to a fourth arrangement of the present invention, the upper cover member and the lower cover member of the spatter protecting cover in the third arrangement of the present invention are connected together so as to be rotatable relative to each other. Longitudinally elongated resilient projections are formed on both sides of the upper cover member. Latch projections are formed on both sides of the lower cover member. The resilient projections of the upper cover member are slidably engaged in the slide grooves, respectively. The latch projections of the lower cover member are engageable with the slide grooves, respectively.

It should be noted that in the second and third arrangements of the present invention the term "a pair of mutually opposing side walls of the longitudinal groove" means two walls that are contiguously provided on both sides of a wall formed with a fulcrum pin supporting hole at right angles to the wall (i.e. two walls that have not yet been formed with slide grooves).

In the locating and clamping apparatus according to the first, third and fourth arrangements of the present invention, a spatter protecting cover is removably fitted at the discharge end of the spatter discharge hole of the clamp body. When the spatter protecting cover is fitted, the spatter discharge hole is closed. Therefore, it is possible to prevent spatter from entering the clamp body through the spatter discharge hole.

In the locating and clamping apparatus according to the second, third and fourth arrangements of the present invention, a longitudinal groove is formed at the outer end of the fulcrum pin supporting hole of the clamp body. Slide grooves are respectively formed in a pair of mutually opposing side walls of the longitudinal groove. A cover is fitted in the slide grooves. The cover prevents the fulcrum pin from coming off. Therefore, labor as required in the prior art to remove the split pins is not needed, and the fulcrum pin can be removed easily when the locating and clamping apparatus is disassembled.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 14A:
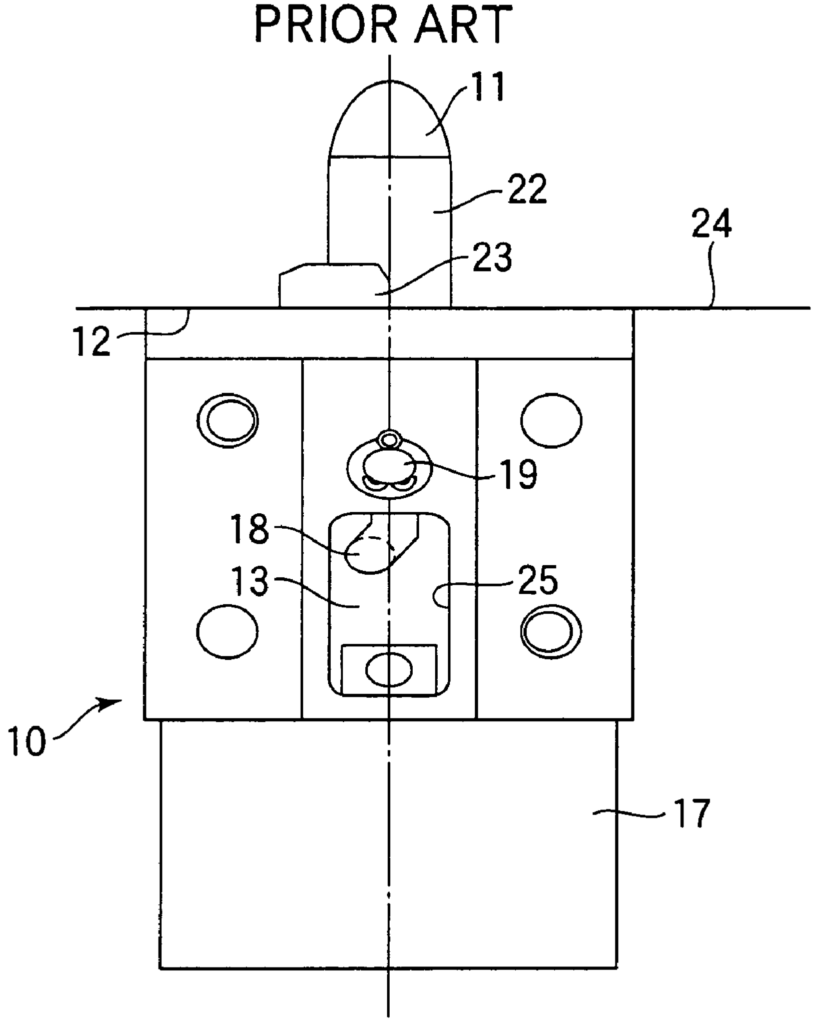
FIG.14A PRIOR ART
FIG. 14A is an external side view of a conventional locating and clamping apparatus.
Figure 14B:
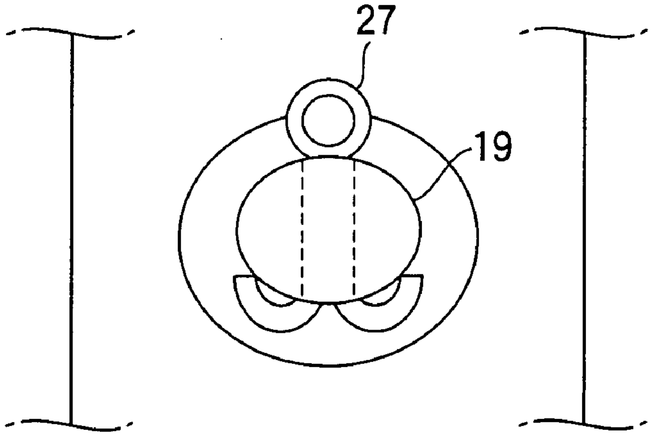
FIG.14B PRIOR ART
FIG. 14B is an enlarged view of an essential part of the conventional locating and clamping apparatus shown in FIG. 14A.

FIGS. 1 to 13F show an embodiment of the locating and clamping apparatus according to the present invention. In the following description made in connection with FIGS. 1 to 13F, the same members as those of the prior art shown in FIGS. 14A and 14B are denoted by the same reference numerals as in FIGS. 14A and 14B. As shown in FIGS. 1 to 8, a clamp body 10 comprises a hollow support-shaped body member 29 and a workpiece retaining member 30. The clamp body 10 is provided with a locating pin 11 projecting therefrom. The proximal end portion of the locating pin 11 is held in a space defined between a hollow in the upper end central portion of the body member 29 and a hollow in the lower end central portion of the workpiece retaining member 30. The body member 29 and the workpiece retaining member 30 are secured with bolts, etc. (not shown). The locating pin 11 is formed with a hollow hole 14 that is open at the lower end thereof. An opening 22 is made in the side wall of the hollow hole 14. The opening 22 allows the hollow hole 14 to communicate with the outside. In FIG. 2, the opening 22 is formed on the left-hand side of the locating pin 11. The position of the opening 22 is ensured by a positioning pin (not shown) passed through a pin-passing hole in the proximal end portion of the locating pin 11.

An annular seating surface 12 is formed on the upper end of the workpiece retaining member 30. The seating surface 12 is disposed outside the locating pin 11. The body member 29 of the clamp body 10 has a longitudinal hole 13 vertically extending through the central portion thereof. The longitudinal hole 13 communicates with the hollow hole 14 of the locating pin 11. A direct acting actuator (air cylinder) 17 is connected to the lower side of the clamp body 10. An output member (piston rod) 33 of the actuator 17 extends into the longitudinal hole 13 of the clamp body 10. A clamp arm 16 is movably disposed in both the longitudinal hole 13 of the clamp body 10 and the hollow hole 14 of the locating pin 11. The lower end of the clamp arm 16 is connected to a bifurcated connecting portion 34 at the upper end of the output member 33 through a connecting pin 35 in such a manner that the clamp arm 16 is pivotable relative to the output member 33. A guide slot 18 is formed in a broad portion of the clamp arm 16. A fulcrum pin 19 is passed through the guide slot 18. The fulcrum pin 19 is supported by fulcrum pin supporting holes 20 in the clamp body 10.

Vertical movement of the output member 33 causes the clamp arm 16 to move up and down. Engagement between the guide slot 18 and the fulcrum pin 19 allows a hook-shaped distal end portion 23 of the clamp arm 16 not only to move up and down but also to pivot sideward about the connecting pin 35. When the output member 33 is moved upward, the distal end portion 23 of the clamp arm 16 is located at an upper central position in the hollow hole 14. When the output member 33 is moved downward, the distal end portion 23 of the clamp arm 16 is pivoted leftward in FIG. 2 to project leftward from the opening 22. FIG. 2 shows a state where the locating pin 11 has been inserted through a positioning hole (locating hole) 36 in a panel-shaped workpiece 24, and the workpiece 24 has been clamped between the distal end portion 23 of the clamp arm 16 and the seating surface 12.

A spatter entry preventing member 52 as shown in FIGS. 9A to 9D is fitted to the surface of the clamp arm 16 to prevent spatter or other foreign matter from entering the guide slot 18 of the clamp arm 16. Referring to FIGS. 1, 2, 9A to 9D, the spatter entry preventing member 52 has a first preventing plate 53 and a second preventing plate 54 that are connected to each other by a connecting plate 55 so that a predetermined spacing is maintained between the first and second preventing plates 53 and 54. Pin-passing holes 56 are formed in the first and second preventing plates 53 and 54, respectively. The fulcrum pin 19 extends through the pin-passing holes 56. The greater part of the clamp arm 16 (i.e. exclusive of the upper portion thereof) is held between the first and second preventing plates 53 and 54. The connecting pin 35 is located within notched grooves 57A and 57B in the first and second preventing plates 53 and 54. It should be noted that illustration of the spatter entry preventing member 52 is omitted in FIG. 5.

Figure 3:
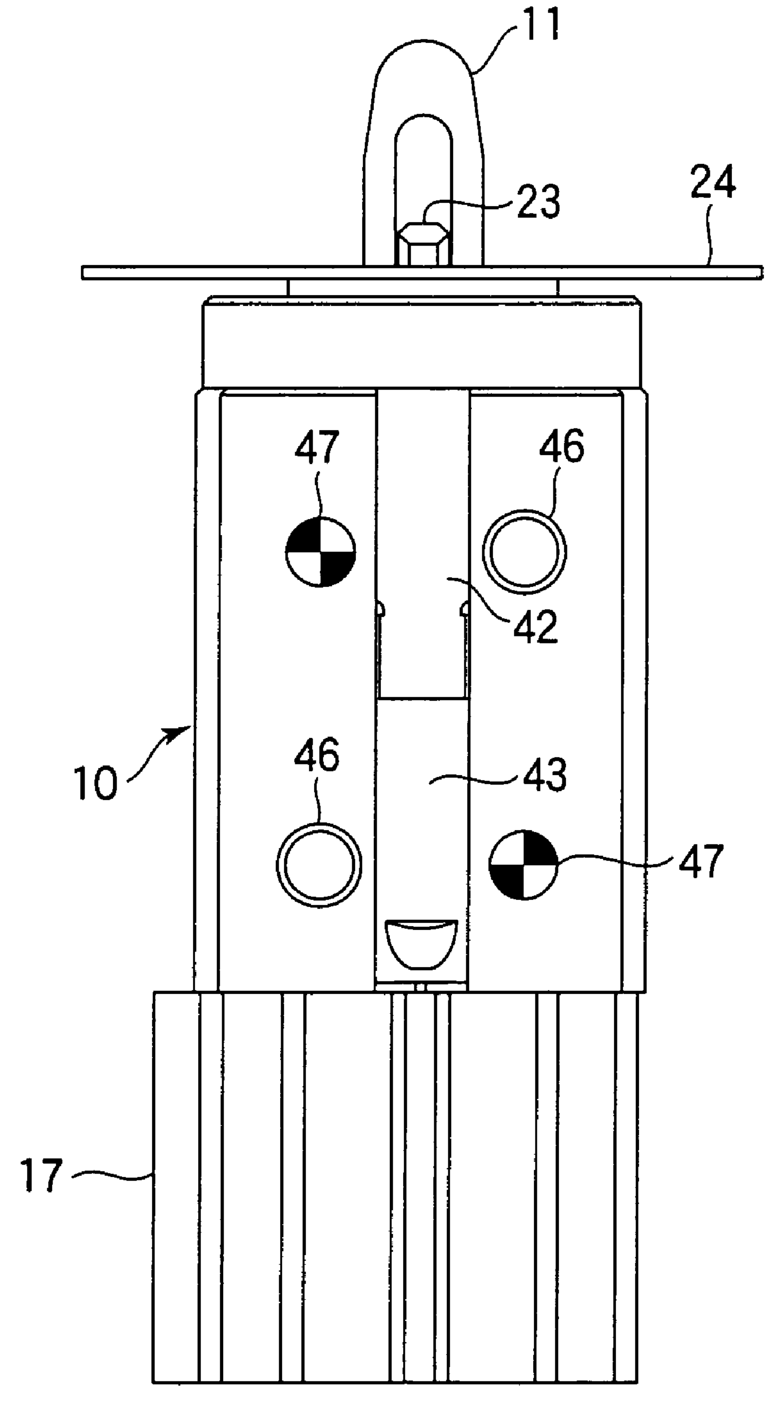
FIG. 3 is an external front view of the embodiment of the locating and clamping apparatus according to the present invention, showing the apparatus in a state where lower cover members are closed.
Figure 4:
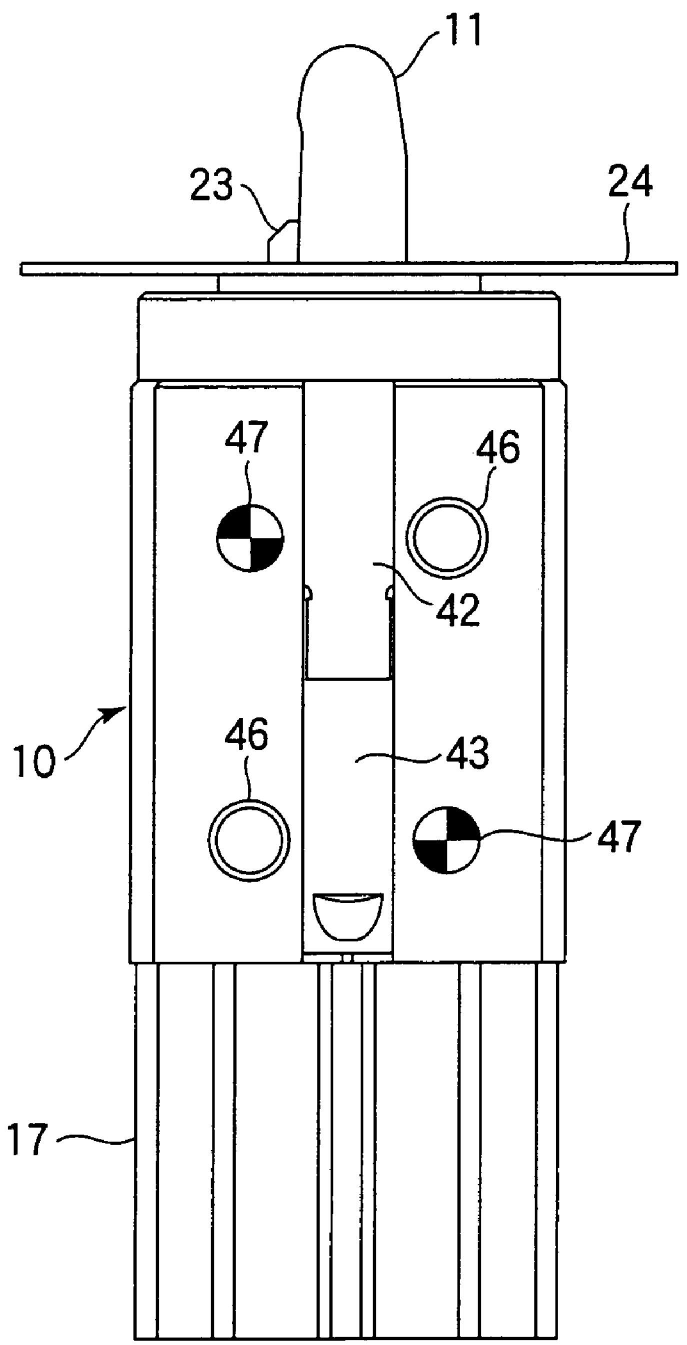
FIG. 4 is an external side view of the embodiment of the locating and clamping apparatus according to the present invention, showing the apparatus in a state where the lower cover members are closed.
Figure 5:
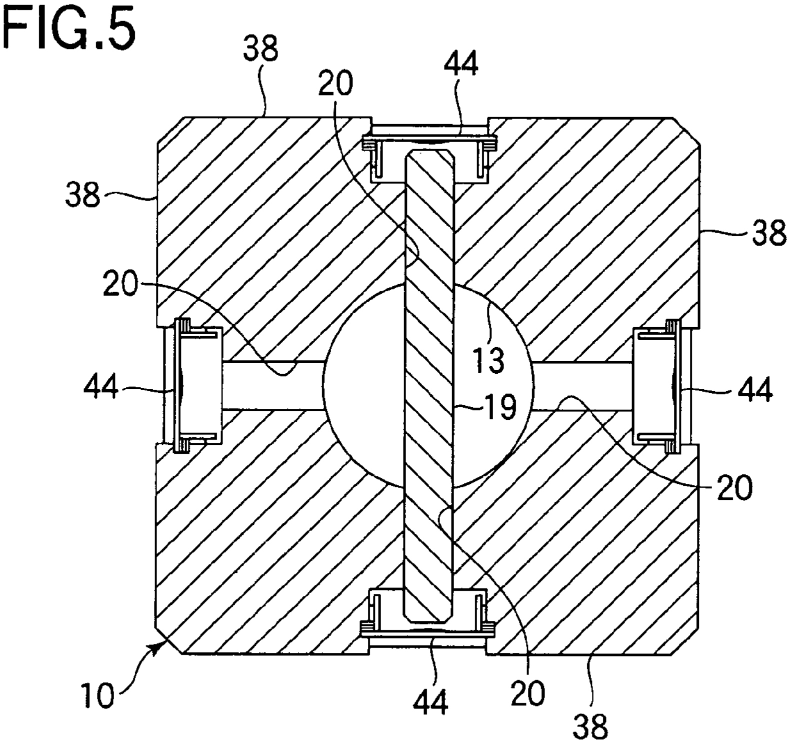
FIG. 5 is a sectional view taken along the line V—V in FIG. 2.

As shown in FIG. 5, the clamp body 10 has an approximately quadrangular horizontal sectional configuration. The four outer faces of the clamp body 10 are defined as mounting surfaces 38. Four fulcrum pin supporting holes 20 are formed in the clamp body 10, extending from the longitudinal hole 13 with a circular sectional configuration formed in the center of the clamp body 10 toward the respective centers of the mounting surfaces 38. The mounting surfaces 38 are used to mount the locating and clamping apparatus on a predetermined apparatus, e.g. a frame, installed along a body welding line. As shown in FIGS. 3 and 4, each mounting surface 38 is formed with a plurality of mounting threaded holes 46 and positioning holes 47. Dowel pins are inserted into the positioning holes 47 to effect positioning, and bolts are screwed into the mounting threaded holes 46 to secure the clamp body 10 to a predetermined apparatus.

Figure 1:
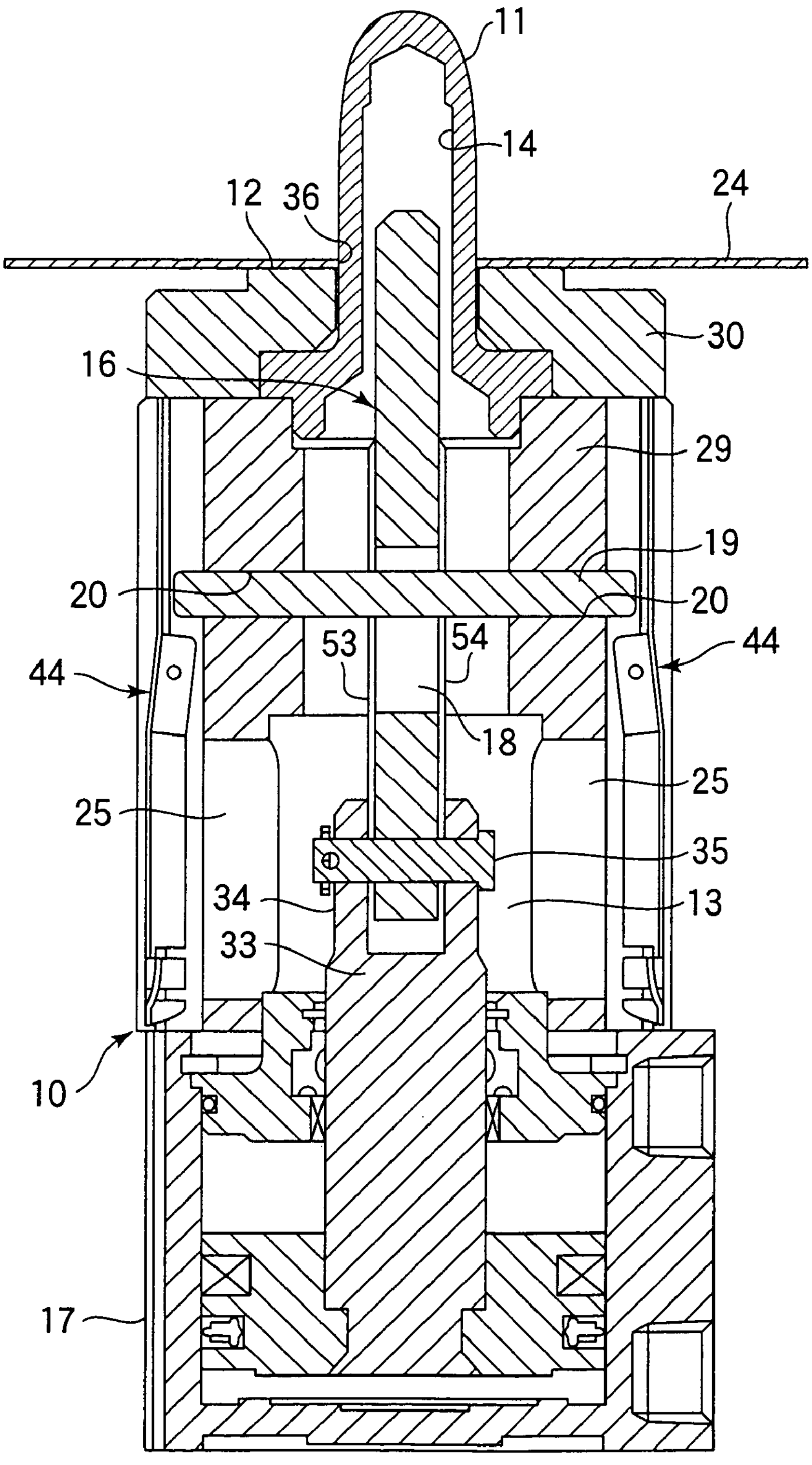
FIG. 1 is a sectional front view of an embodiment of the locating and clamping apparatus according to the present invention.
Figure 2:
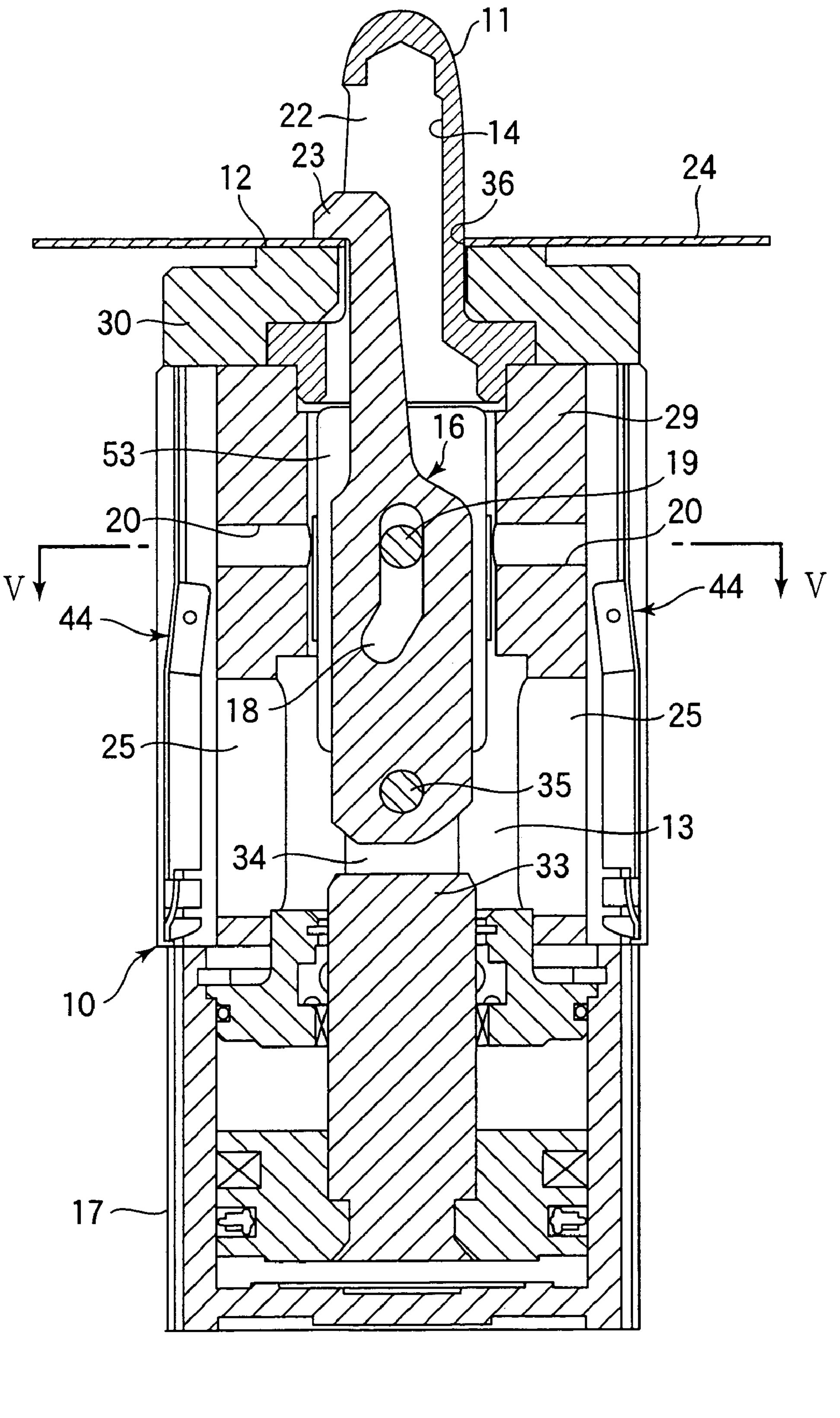
FIG. 2 is a sectional side view of the embodiment of the locating and clamping apparatus according to the present invention.
Figure 6:
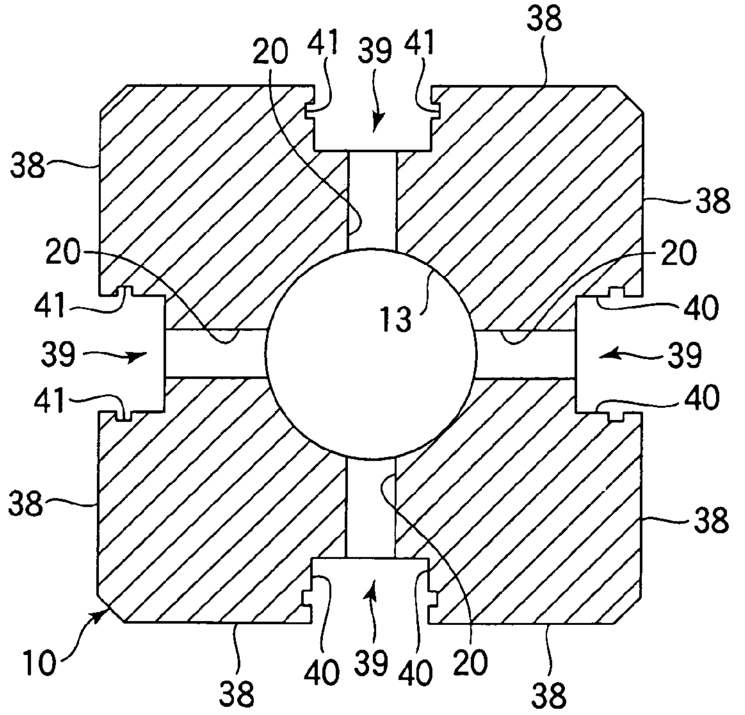
FIG. 6 is a sectional view taken along the line V—V in FIG. 2, showing only a clamp body.

As shown in FIGS. 1, 2 and 6, a lower portion of the clamp body 10 is formed with spatter discharge holes 25 that provide communication between the longitudinal hole 13 and the respective centers of the four mounting surfaces 38, thereby allowing the longitudinal hole 13 to communicate with the outside through the spatter discharge holes 25. Each mounting surface 38 of the clamp body 10 is formed with a longitudinal groove 39 at the outer end of the associated fulcrum pin supporting hole 20 and the discharge end of the associated spatter discharge hole 25. The longitudinal groove 39 extends from the upper end of the clamp body 10 to the lower end thereof and has a rectangular sectional configuration, the outer end of which is open. Thus, the longitudinal groove 39 communicates with both the spatter discharge hole 25 and the fulcrum pin supporting hole 20. Slide grooves 41 are respectively formed in a pair of mutually opposing side walls 40 of the longitudinal groove 39 (i.e. of the three walls of the longitudinal groove 39, two walls that are provided with neither a spatter discharge hole 25 nor a fulcrum pin supporting hole 20). A spatter protecting cover 44 having an upper cover member 42 and a lower cover member 43 (see FIGS. 10A to 10D) is fitted in the slide grooves 41.

The upper cover member 42 and the lower cover member 43, which constitute the spatter protecting cover 44, are connected together so as to be rotatable relative to each other. Longitudinally elongated resilient projections 49 are formed on both sides of the upper cover member 42. Latch projections 50 are formed on both sides of the lower cover member 43. The resilient projections 49 of the upper cover member 42 are slidably engaged in the slide grooves 41, respectively. The latch projections 50 of the lower cover member 43 are engageable with the slide grooves 41, respectively. The upper cover member 42 of the spatter protecting cover 44 prevents the fulcrum pin 19 from coming off. The lower cover member 43 of the spatter protecting cover 44 opens or closes the spatter discharge hole 25. It should be noted that only the upper cover member 42 may be used to retain the fulcrum pin 19 in position.

As shown in FIGS. 10A to 13F, the upper cover member 42 has on each side thereof a longitudinal cut with a predetermined length that is made in a portion close to the upper end thereof at a position a predetermined distance inward from the corresponding side edge of the upper cover member 42. In addition, a lateral cut is formed between the upper end of each longitudinal cut and the corresponding side edge of the upper cover member 42. Portions of the upper cover member 42 between the longitudinal cuts and the corresponding side edges are elastically deformed inward (rightward in FIG. 10C), thereby forming the longitudinally elongated resilient projections 49. Both side edge portions of the upper cover member 42 that extend from the lower end thereof through a predetermined length are bent inward to form bent portions 59 that extend at right angles to a plane portion 64 of the upper cover member 42. The plane portion 64 between the bent portions 59 is slightly inclined outward with respect to a plane portion 63 where the bent portions 59 are not present (see FIG. 10C). The inclination of the plane portion 64 eliminates the gap that would otherwise be present between the plane portion 64 of the upper cover member 42 and a plane portion 65 of the lower cover member 43, and hence prevents entry of spatter. The width of the plane portion 64 between the bent portions 59 is substantially equal to what is left when double the plate thickness of the upper cover member 42 is subtracted from the width of the plane portion 63, where no bent portions 59 are present. Hinge holes 60 are formed on the respective outer surfaces of the bent portions 59.

Both lateral edge portions of the lower cover member 43 are bent inward over the entire length of the lower cover member 43 to form elongated bent portions 66 that extend at right angles to the plane portion 65 of the lower cover member 43. The upper ends of the elongated bent portions 66 project upward beyond the plane portion 65 of the lower cover member 43. The projecting portions of the elongated bent portions 66 have hinge projections 61 formed on the respective inner sides of the upper end portions thereof. The width of the plane portion 65 of the lower cover member 43 is equal to the width of the plane portion 63 of the upper cover member 42, where no bent portions 59 are present. The projecting portions of the elongated bent portions 66 of the lower cover member 43 are gradually bent inward of the lower cover member 43 at a slight angle as the distance from the proximal ends of the projecting portions increases toward the distal ends thereof. The slight-angle deformation of the projecting portions of the elongated bent portions 66 imparts resilient force to the projecting portions and hence induces retaining force between the bent portions 59 of the upper cover member 42 and the elongated bent portions 66 of the lower cover member 43. The retaining force allows the lower cover member 43 to be held in an open position. Consequently, the efficiency of the spatter raking operation increases. Latch projections 50 are formed on the outer side surfaces of the lower end portions of the elongated bent portions 66. To impart outward resiliency to the latch projections 50, notches 67 are formed in the elongated bent portions 66 at respective positions above and below each latch projection 50. Further, the surface at the lower end of the plane portion 65 of the lower cover member 43 is formed with a recess (projection on the reverse side) 62 for a cover opening operation.

The projecting portions of the elongated bent portions 66 of the lower cover member 43 are laid over the respective outer sides of the bent portions 59 of the upper cover member 42, and the hinge projections 61 of the elongated bent portions 66 are rotatably fitted into the hinge holes 60 of the bent portions 59, thereby enabling the lower cover member 43 to pivot relative to the upper cover member 42, as shown in FIGS. 10A to 10D. During assembly of the locating and clamping apparatus, the left and right resilient projections 49 of the upper cover member 42 of the spatter protecting cover 44 are slidably fitted into the left and right slide grooves 41, respectively, in one longitudinal groove 39 of the clamp body 10. The spatter protecting cover 44 can slide longitudinally because the resilient projections 49 are slidably fitted in the slide grooves 41. However, as shown in FIGS. 1 to 4, the upper end of the upper cover member 42 is moved to a position where it abuts against the lower side of the workpiece retaining member 30, and maintained in this position. Therefore, the spatter protecting cover 44 cannot be moved by a little external force. When the lower cover member 43 is closed, the left and right latch projections 50 are engaged with the left and right slide grooves 41 to maintain the lower cover member 43 in the closed position. The upper cover member 42 and the lower cover member 43 of the spatter protecting cover 44 close the longitudinal groove 39, thus preventing spatter from entering the longitudinal hole 13 of the clamp body 10 through the spatter discharge hole 25 and the fulcrum pin supporting hole 20.

Figure 7:
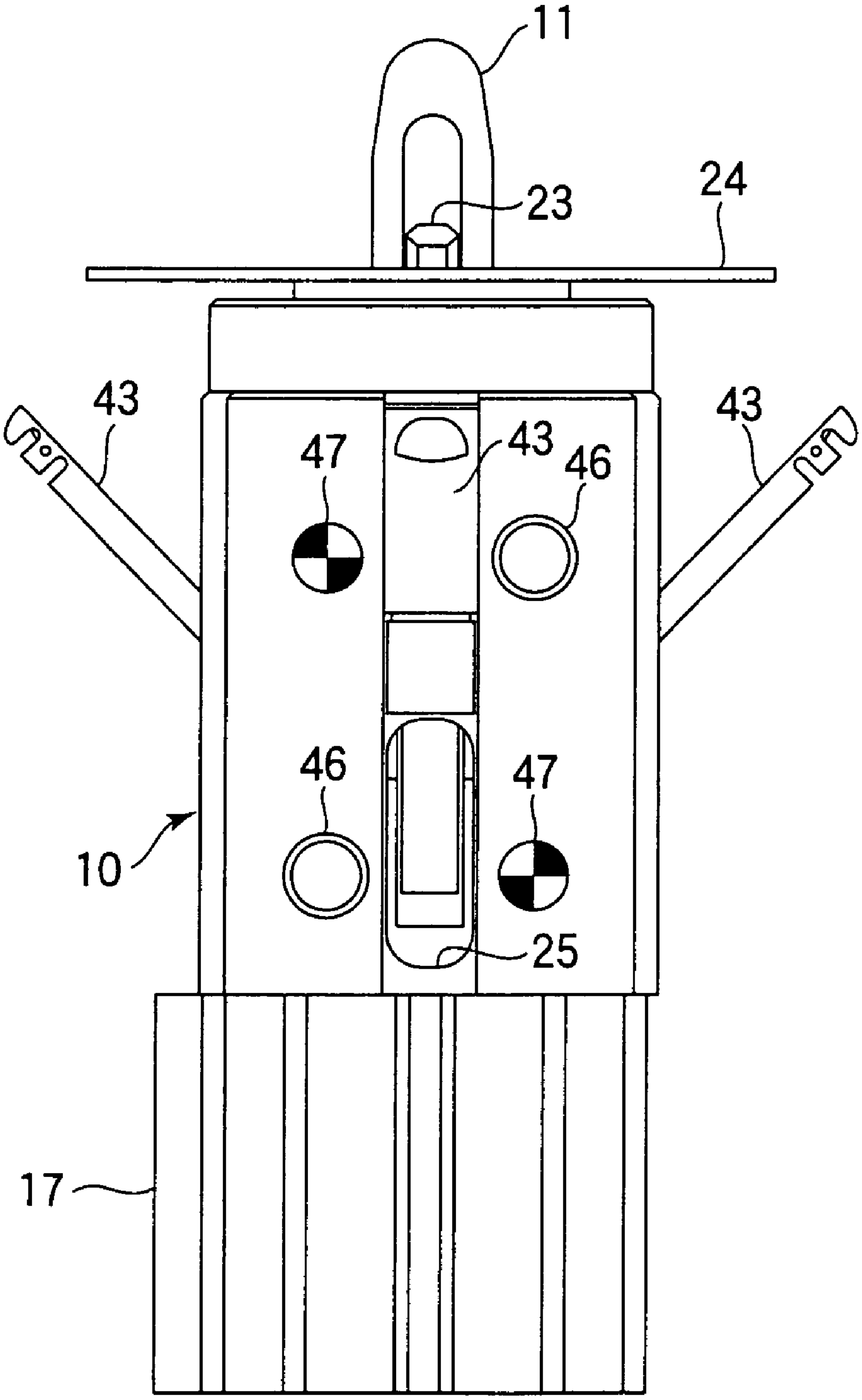
FIG. 7 is an external front view of the embodiment of the locating and clamping apparatus according to the present invention, showing the apparatus in a state where the lower cover members are fully open.
Figure 8:
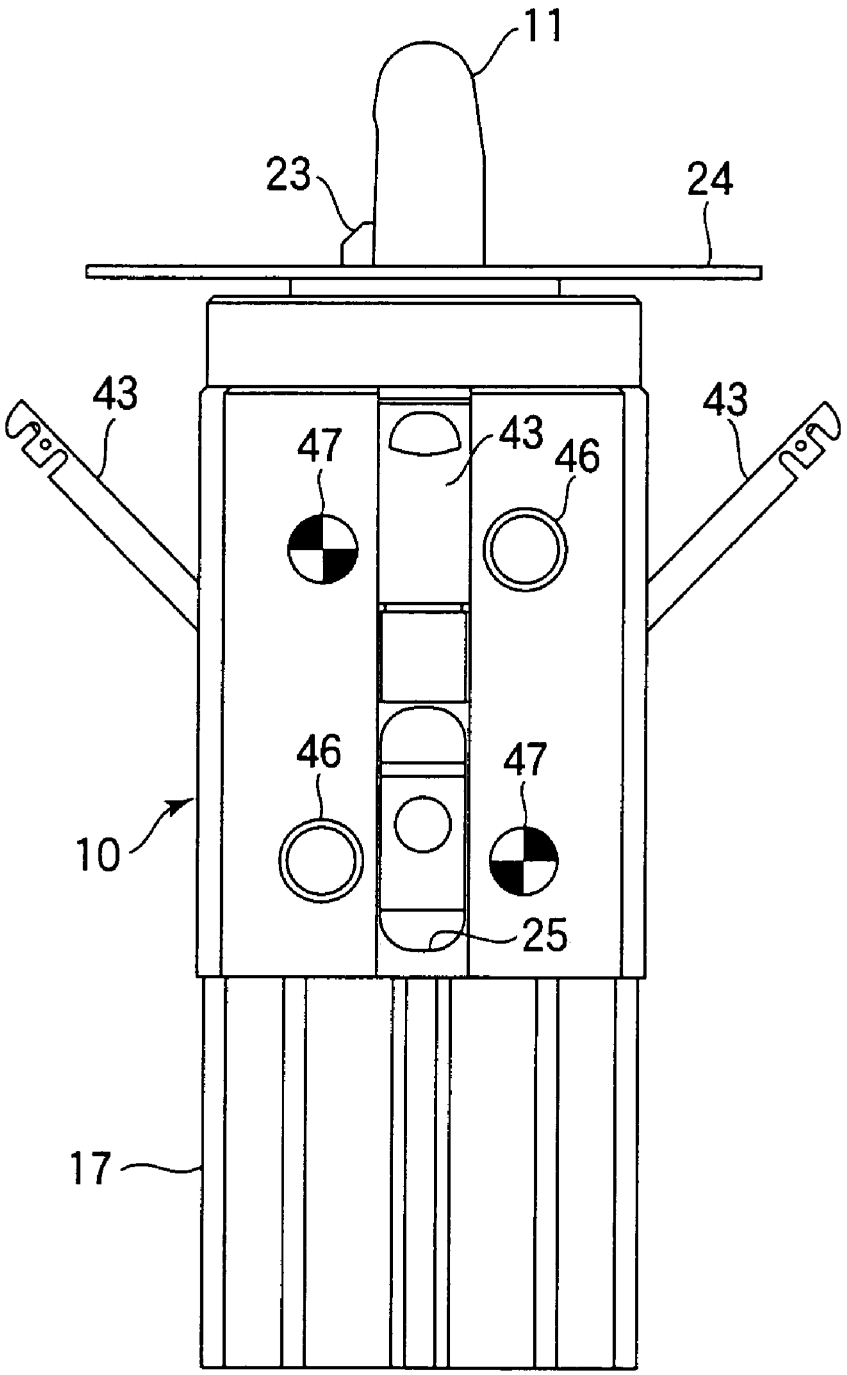
FIG. 8 is an external side view of the embodiment of the locating and clamping apparatus according to the present invention, showing the apparatus in a state where the lower cover members are fully open.
Figure 9A:
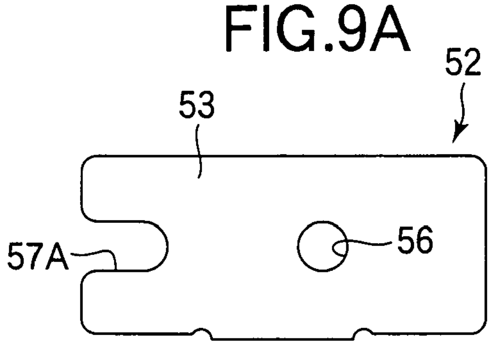
FIG. 9A is a plan view of a spatter entry preventing member used in the locating and clamping apparatus according to the present invention.
Figure 9C:
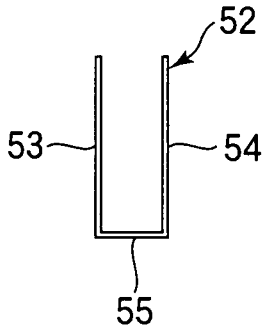
FIG. 9C is a right side view of the spatter entry preventing member.
Figure 9B:
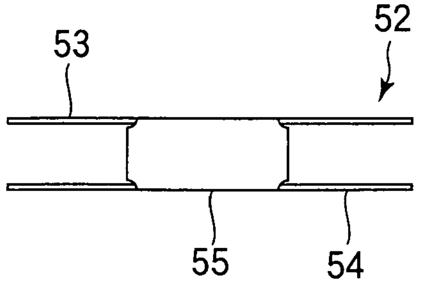
FIG. 9B is a front view of the spatter entry preventing member.
Figure 9D:
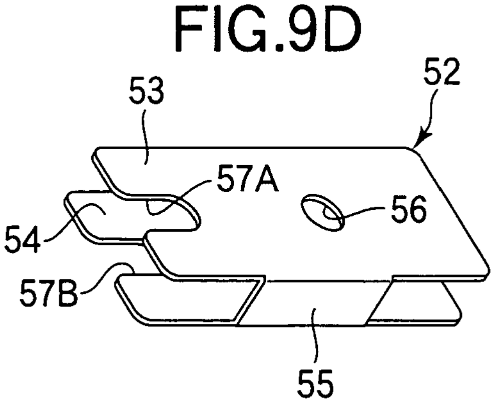
FIG. 9D is a perspective view of the spatter entry preventing member.
Figure 10A:
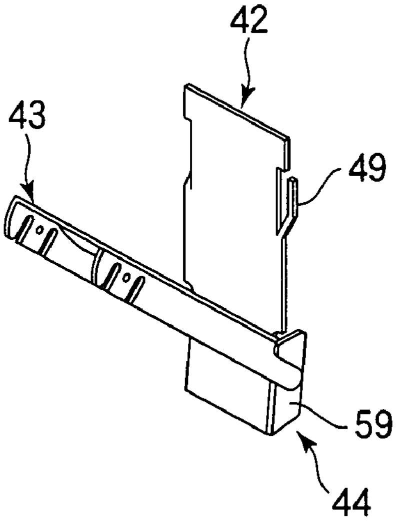
FIG. 10A is a perspective view of one spatter protecting cover used in the locating and clamping apparatus according to the present invention, showing the spatter protecting cover when it is fully open.
Figure 10C:
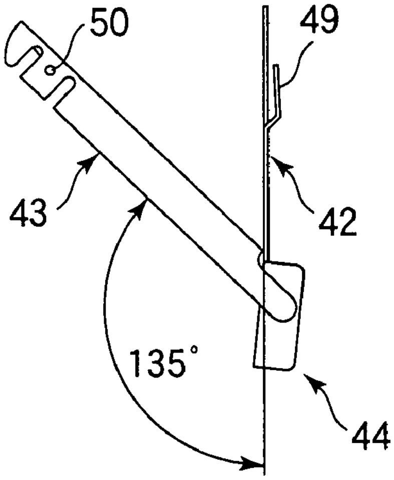
FIG. 10C is a side view of the spatter protecting cover when it is fully open.
Figure 10B:
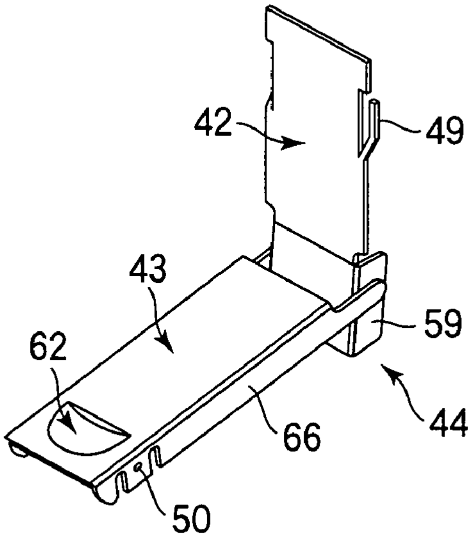
FIG. 10B is a perspective view of the spatter protecting cover when it is open at 80 degrees.
Figure 10D:
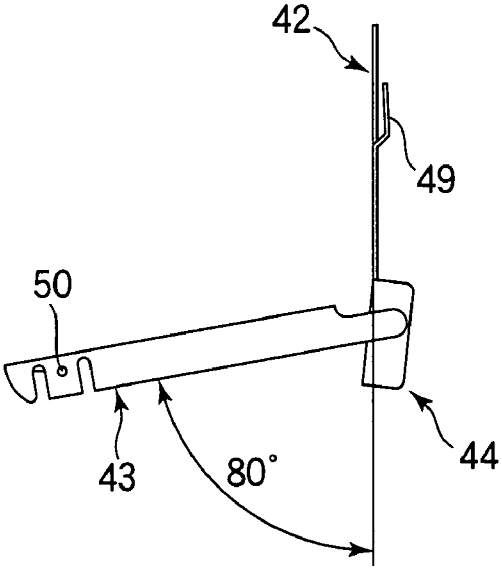
FIG. 10D is a side view of the spatter protecting cover when it is open at 80 degrees.
Figure 11E:
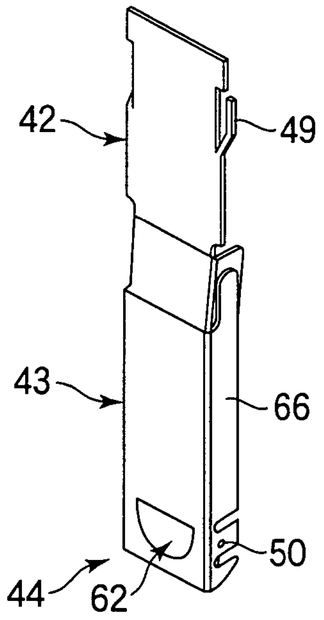
FIG. 11E is a perspective view of the spatter protecting cover in the closed position.
Figure 11B:
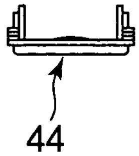
FIG. 11B is a plan view of the spatter protecting cover in the closed position.
Figure 11A:
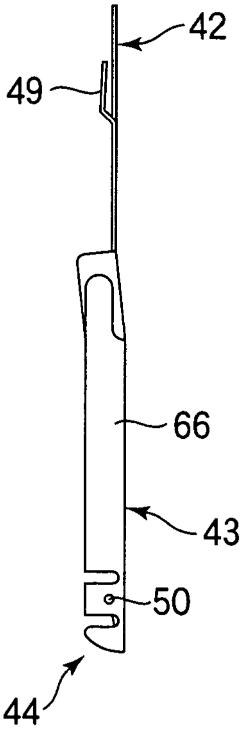
FIG. 11A is a left side view of one spatter protecting cover of the locating and clamping apparatus according to the present invention, showing the spatter protecting cover in a closed position.
Figure 11C:
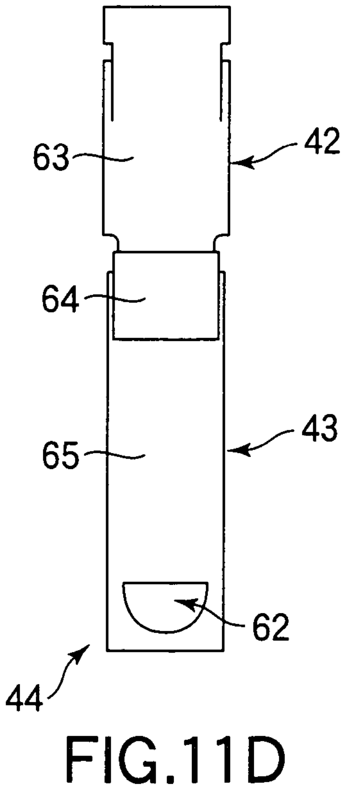
FIG. 11C is a front view of the spatter protecting cover in the closed position.
Figure 11F:
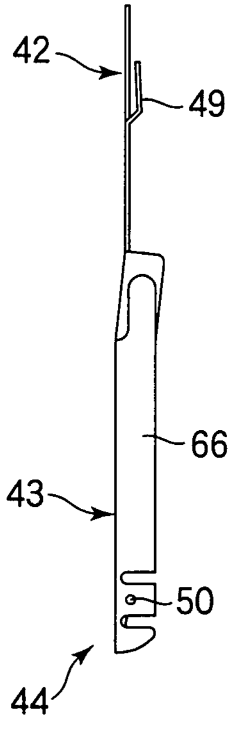
FIG. 11F is a right side view of the spatter protecting cover in the closed position.
Figure 11D:
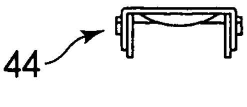
FIG. 11D is a bottom view of the spatter protecting cover in the closed position.
Figure 12B:
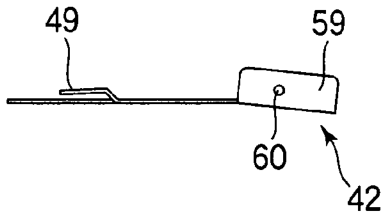
FIG. 12B is a plan view of the upper cover member.
Figure 12E:
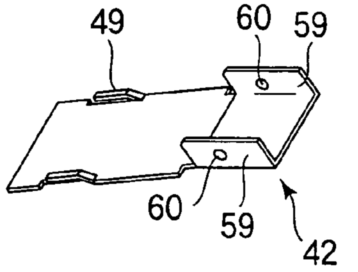
FIG. 12E is a perspective view of the upper cover member.
Figure 12A:
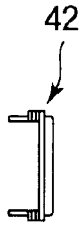
FIG. 12A is a left side view of one upper cover member of the locating and clamping apparatus according to the present invention.
Figure 12C:
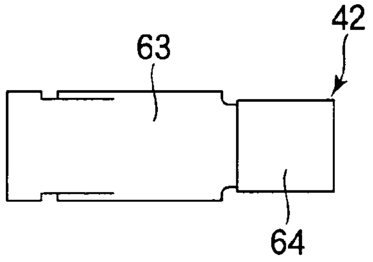
FIG. 12C is a front view of the upper cover member.
Figure 12F:
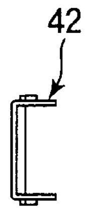
FIG. 12F is a right side view of the upper cover member.
Figure 12D:
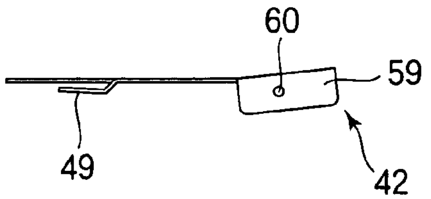
FIG. 12D is a bottom view of the upper cover member.
Figure 13B:
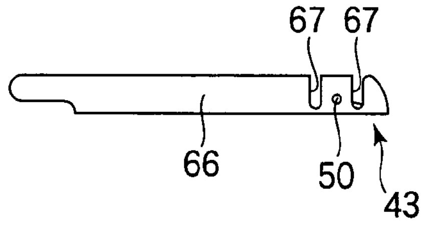
FIG. 13B is a plan view of the lower cover member.
Figure 13E:
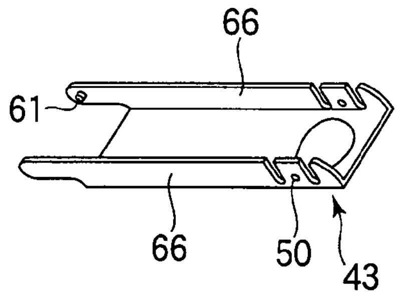
FIG. 13E is a perspective view of the lower cover member.
Figure 13A:
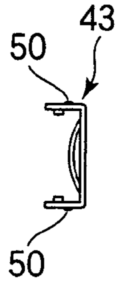
FIG. 13A is a left side view of one lower cover member of the locating and clamping apparatus according to the present invention.
Figure 13C:
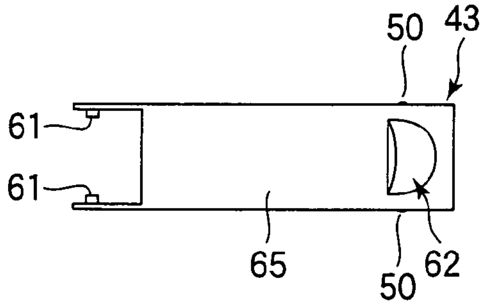
FIG. 13C is a front view of the lower cover member.
Figure 13F:
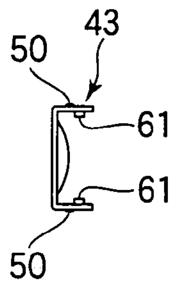
FIG. 13F is a right side view of the lower cover member.
Figure 13D:
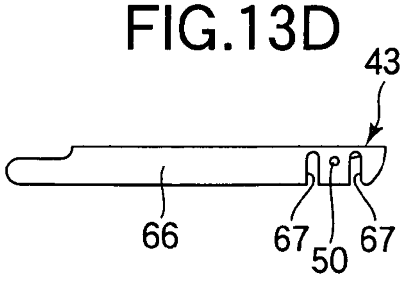
FIG. 13D is a bottom view of the lower cover member.

When the lower cover member 43 is to be opened, a force is applied to the lower cover member 43 in the direction for opening it by engaging the tip of a flat-blade screwdriver with the upper end portion of the recess 62 on the lower cover member 43. The force disengages the latch projections 50 from the slide grooves 41 and allows the lower cover member 43 to pivot about the hinge projections 61. In this way, the lower cover member 43 can be opened. FIGS. 10A to 10D show the spatter protecting cover 44 when the lower cover member 43 is open at 80 degrees and when it is open at 135 degrees (fully open). FIGS. 7 and 8 show the locating and clamping apparatus in a state where all the lower cover members 43 is fully open. When the locating and clamping apparatus is in the state shown in FIGS. 7 and 8, a raking implement is inserted into each spatter discharge hole 25 to discharge spatter accumulated in the longitudinal hole 13.

It should be noted that the present invention is not necessarily limited to the foregoing embodiments but can be modified in a variety of ways without departing from the gist of the present invention.

What is claimed is:

1. In a locating and clamping apparatus comprising:

a clamp body having a longitudinal hole;

a locating pin projecting from the clamp body, said locating pin having a hollow hole communicating with said longitudinal hole;

a seating surface formed outside the locating pin;

a clamp arm movably disposed in both the longitudinal hole of the clamp body and the hollow hole of the locating pin;

a direct acting actuator having an output member reciprocatably disposed in the longitudinal hole of the clamp body, said output member and said clamp arm being connected to each other through a connecting pin;

a fulcrum pin extending through a guide slot formed in the clamp arm, said fulcrum pin being supported at each end thereof by a fulcrum pin supporting hole in the clamp body; and a spatter discharge hole formed in the clamp body to allow the longitudinal hole to communicate with an outside;

wherein a workpiece can be clamped between a distal end portion of the clamp arm and the seating surface;

the improvement which comprises:

a longitudinal groove formed at an outer end of said fulcrum pin supporting hole;

slide grooves respectively formed in a pair of mutually opposing side walls of said longitudinal groove; and a cover fitted in said slide grooves, said cover preventing said fulcrum pin from coming off.

2. In a locating and clamping apparatus comprising:

a clamp body having a longitudinal hole;

a locating pin projecting from the clamp body, said locating pin having a hollow hole communicating with said longitudinal hole;

a seating surface formed outside the locating pin;

a clamp arm movably disposed in both the longitudinal hole of the clamp body and the hollow hole of the locating pin;

a direct acting actuator having an output member reciprocatably disposed in the longitudinal hole of the clamp body, said output member and said clamp arm being connected to each other through a connecting pin;

a fulcrum pin extending thorough a guide slot formed in the clamp arm, said fulcrum pin being supported at each end thereof by a fulcrum pin supporting hole in the clamp body; and a spatter discharge hole formed in the clamp body to allow the longitudinal hole to communicate with an outside;

wherein a workpiece can be clamped between a distal end portion of the clamp arm and the seating surface;

the improvement which comprises:

a longitudinal groove formed in a side surface of said clamp body, said longitudinal groove communicating with both said spatter discharge hole and said fulcrum pin supporting hole;

slide grooves respectively formed in a pair of mutually opposing side walls of said longitudinal groove; and a spatter protecting cover having an upper cover member and a lower cover member, said spatter protecting cover being fitted in said slide grooves;

wherein the upper cover member of said spatter protecting cover prevents said fulcrum pin from coming off, and the lower cover member of said spatter protecting cover opens or closes said spatter discharge hole.

3. A locating and clamping apparatus according to claim 2, wherein said upper cover member and lower cover member of said spatter protecting cover are connected together so as to be rotatable relative to each other, said locating and clamping apparatus further comprising:

longitudinally elongated resilient projections formed on both sides of said upper cover member; and latch projections formed on both sides of said lower cover member;

wherein said resilient projections of the upper cover member are slidably engaged in said slide grooves, respectively, and said latch projections of the lower cover member are engageable with said slide grooves, respectively.

* * * * *